(12) United States Patent
Dyson et al.

(10) Patent No.: US 11,499,434 B2
(45) Date of Patent: Nov. 15, 2022

(54) COOLED AIRFOIL AND METHOD OF MAKING

(71) Applicant: GENERAL ELECTRIC COMPANY, Schenectady, NY (US)

(72) Inventors: Thomas Earl Dyson, Niskayuna, NY (US); Brian Brzek, Niskayuna, NY (US); Fred Willett, Jr., Schenectady, NY (US); Paul Dimascio, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/262,399

(22) PCT Filed: Jul. 31, 2018

(86) PCT No.: PCT/US2018/044712
§ 371 (c)(1),
(2) Date: Jan. 22, 2021

(87) PCT Pub. No.: WO2020/027822
PCT Pub. Date: Feb. 6, 2020

(65) Prior Publication Data
US 2021/0310362 A1    Oct. 7, 2021

(51) Int. Cl.
*F01D 5/18*        (2006.01)
*B33Y 80/00*       (2015.01)

(52) U.S. Cl.
CPC .............. *F01D 5/187* (2013.01); *B33Y 80/00* (2014.12); *F05D 2230/11* (2013.01);
(Continued)

(58) Field of Classification Search
CPC . F01D 5/187; F01D 5/186; F01D 5/20; F01D 11/04; F05D 2240/307;
(Continued)

(56) References Cited

U.S. PATENT DOCUMENTS 4,411,597 A  * 10/1983  Koffel ...................... F01D 5/20
                                                      416/224
6,200,439 B1 *  3/2001  Wei .......................... B23H 9/00
                                                      204/290.01

(Continued)

FOREIGN PATENT DOCUMENTS

JP      60030401 A       2/1985
JP      07042504 A       2/1995
(Continued)

OTHER PUBLICATIONS

International Search Report for PCT Application No. PCT/US2018/044712 dated Apr. 23, 2019, 3 pages.
(Continued)

*Primary Examiner* — Eldon T Brockman
(74) *Attorney, Agent, or Firm* — Charlotte Wilson; James Pemrick; Hoffman Warnick LLC (57) ABSTRACT

In one embodiment, an airfoil includes an airfoil body portion, an airfoil tip portion disposed radially outward of the airfoil body portion, an airfoil root portion, and a plurality of radial cooling passages extending through the airfoil body portion from the root portion to the tip airfoil portion. The airfoil body portion and the airfoil tip portion are joined at a braze interface or a weld interface. The airfoil tip portion includes at least one manifold fluidly connecting at least one radial cooling passage to at least one other radial cooling passage.

20 Claims, 9 Drawing Sheets

(52) U.S. Cl.
CPC .. *F05D 2230/211* (2013.01); *F05D 2230/237* (2013.01); *F05D 2230/31* (2013.01); *F05D 2260/202* (2013.01); *F05D 2260/232* (2013.01)

(58) Field of Classification Search
CPC ......... F05D 2240/125; F05D 2260/204; B23K 2101/001; B23K 1/0018
See application file for complete search history.

(56) References Cited

U.S. PATENT DOCUMENTS

| | | | | |
|---|---|---|---|---|
| 6,582,584 | B2* | 6/2003 | Lee | F01D 5/187 |
| | | | | 205/660 |
| 7,066,716 | B2* | 6/2006 | Jacala | F01D 5/187 |
| | | | | 415/115 |
| 7,334,993 | B2* | 2/2008 | Sekihara | F01D 5/225 |
| | | | | 416/190 |
| 10,287,896 | B2* | 5/2019 | Marcin, Jr. | F01D 5/147 |
| 10,480,329 | B2* | 11/2019 | Spangler | F01D 25/12 |
| 10,519,777 | B2* | 12/2019 | Packer | F01D 5/147 |
| 10,934,855 | B2* | 3/2021 | Washko | F01D 5/20 |
| 11,118,462 | B2* | 9/2021 | Paradis | F01D 5/187 |
| 2002/0025248 | A1* | 2/2002 | Lee | B23H 9/006 |
| | | | | 415/1 |
| 2003/0228222 | A1 | 12/2003 | Bunker et al. | |
| 2006/0056969 | A1* | 3/2006 | Jacala | F01D 5/186 |
| | | | | 416/97 R |
| 2007/0044936 | A1* | 3/2007 | Memmen | B22C 9/103 |
| | | | | 164/369 |
| 2009/0049689 | A1 | 2/2009 | Hiskes | |
| 2010/0080687 | A1 | 4/2010 | Vance | |
| 2018/0306036 | A1* | 10/2018 | Spangler | F01D 9/041 |
| 2019/0345826 | A1* | 11/2019 | Packer | B22F 7/08 |
| 2020/0088043 | A1* | 3/2020 | Washko | B23P 6/005 |
| 2020/0240274 | A1* | 7/2020 | Paradis | F01D 5/187 |

FOREIGN PATENT DOCUMENTS

| | | |
|---|---|---|
| JP | 2002180801 A | 6/2002 |
| JP | 2006083851 A | 3/2006 |
| WO | 2020027822 A1 | 2/2020 |

OTHER PUBLICATIONS

International Preliminary Report on Patentability for PCT Application No. PCT/US2018/044712 dated Feb. 2, 2021, 12 pages.
Notice of Reasons for Refusal for corresponding JP Application No. 2021-500269 dated May 30, 2022, 5 pages.

* cited by examiner

FIG. 12

COOLED AIRFOIL AND METHOD OF MAKING

BACKGROUND

The disclosure relates generally to cooled structures of a gas turbine and more specifically systems and methods relating to turbine airfoils.

In a large frame heavy-duty industrial gas turbine engine, a hot gas stream generated in a combustor is passed through a turbine to produce mechanical work. The turbine includes one or more rows or stages of stator vanes and rotor blades that react with the hot gas stream in a progressively decreasing temperature. The efficiency of the turbine—and therefore the engine—can be increased by passing a higher temperature gas stream into the turbine. However, the turbine inlet temperature may be limited to the material properties of the turbine, especially the first stage vanes and blades, and an amount of cooling capability for these first stage airfoils.

The first stage rotor and stator components are exposed to the highest gas stream temperatures, with the temperature gradually decreasing as the gas stream passes through the turbine stages. The first and second stage airfoils (blades and vanes) should be cooled by passing cooling air through internal cooling passages and discharging the cooling air through film cooling holes to provide a blanket layer of cooling air to protect the cooled surface from the hot gas stream.

The turbine rotor blades are often formed using investment casting and metallic super-alloy materials, which have high tolerance to mechanical stress and strain, as well as thermal stresses and gradients. However, the geometries and features that can be formed via the investment casting process are limited.

SUMMARY

Aspects and advantages of the disclosure will be set forth in part in the following description, or may be learned through practice of the disclosure.

In one embodiment, an airfoil includes an airfoil body portion, an airfoil tip portion disposed radially outward of the airfoil body portion, an airfoil root portion, and a plurality of radial cooling passages extending through the airfoil body portion from the root portion to the tip airfoil portion. The airfoil body portion and the airfoil tip portion are joined at a braze interface or a weld interface. The airfoil tip portion includes at least one manifold fluidly connecting at least one radial cooling passage to at least one other radial cooling passage.

In another embodiment, an airfoil includes an airfoil body portion, an airfoil tip portion disposed radially outward of the airfoil body portion, an airfoil root portion, and a plurality of radial cooling passages extending through the airfoil body portion from the root portion to the airfoil tip portion. The airfoil tip portion includes at least one manifold fluidly connecting at least one radial cooling passage to at least one other radial cooling passage. The manifold is radially outward of at least one joint interface.

In another embodiment, a method of forming an airfoil includes forming an airfoil body portion via investment casting, forming at least one radial cooling passage within the airfoil body using shaped tube electrochemical machining (STEM), forming an airfoil tip portion, and joining the airfoil tip portion to the airfoil body portion.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure, including the best mode thereof, directed to one of ordinary skill in the art, is set forth in the specification, which makes reference to the appended figures, in which.

Repeat use of reference characters in the present specification and drawings is intended to represent the same or analogous features or elements of the present disclosure.

DETAILED DESCRIPTION

Reference will now be made in detail to aspects of the present embodiments, one or more examples of which are illustrated in the accompanying drawings. The detailed description uses numerical and letter designations to refer to features in the drawings. Like or similar designations in the drawings and description have been used to refer to like or similar parts of the present embodiments. As used herein, the terms "first", "second", and "third" may be used interchangeably to distinguish one component from another and are not intended to signify location or importance of the individual components. The terms "upstream" or "aft", and "downstream" or "forward" refer to the relative direction with respect to fluid flow in a fluid pathway. For example, "upstream" or "aft" refers to the direction from which the fluid flows, sometimes referred to as 'rear'. "Downstream" or "forward" refers to the direction to which the fluid flows, sometimes referred to as 'front'. The term "radially" refers to the relative direction that is substantially perpendicular to an axial centerline of a particular component, and the term "axially" refers to the relative direction that is substantially parallel to an axial centerline of a particular component. The terms "circumferential" and "tangential" may refer to the direction aligned with the circumference of a rotating turbine or compressor rotor.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

Each example is provided by way of explanation of the present embodiments, not limitation of the present embodiments. In fact, it will be apparent to those skilled in the art that modifications and variations can be made in the present embodiments without departing from the scope or spirit thereof. For instance, features illustrated or described as part of one embodiment may be used on another embodiment to yield a still further embodiment. Thus, it is intended that the present embodiments cover such modifications and variations as come within the scope of the appended claims and their equivalents. Although exemplary aspects of the present embodiments will be described generally in the context of a gas turbine for purposes of illustration, one of ordinary skill in the art will readily appreciate that aspects of the present embodiments may be applied to any turbomachine and is not limited to an industrial gas turbine unless specifically recited in the claims. Although an industrial, marine, or land based gas turbine is shown and described herein, the present disclosure as shown and described herein is not limited to a land based and/or industrial, and/or marine gas turbine unless otherwise specified in the claims. For example, the disclosure as described herein may be used in any type of turbine including but not limited to an aero-derivative turbine or marine gas turbine as well as an aero engine turbine, and/or aircraft engines.

Figure 1:
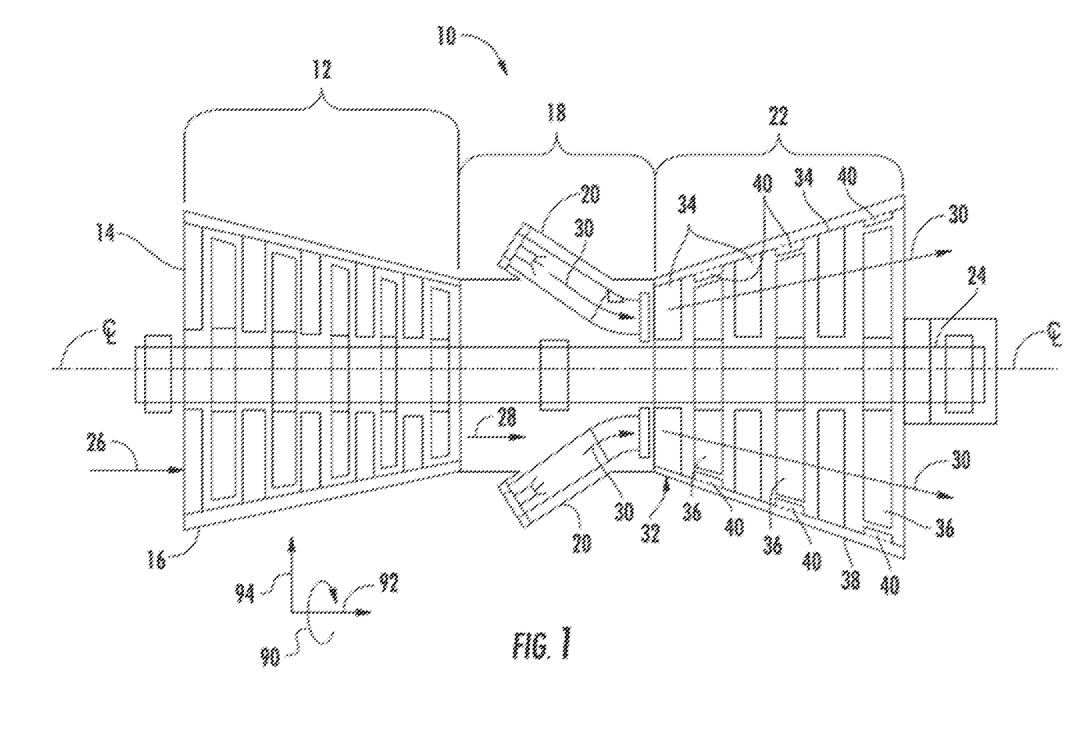
FIG. 1 is a schematic of a typical gas turbine as may incorporate embodiments of the present specification.

Referring now to the drawings, wherein like numerals refer to like components, FIG. 1 illustrates an example of a gas turbine 10 which may incorporate various aspects of the present embodiments. As shown, the gas turbine 10 generally includes a compressor section 12 having an inlet 14 disposed at an upstream end of the gas turbine 10, and a casing 16 that at least partially surrounds the compressor section 12. The gas turbine 10 further includes a combustion section 18 having at least one combustor 20 downstream from the compressor section 12, and a turbine section 22 downstream from the combustion section 18. As shown, the combustion section 18 may include a plurality of the combustors 20. A shaft 24 extends axially through the gas turbine 10. FIG. 1 illustrates the radial 94, axial 92 and circumferential directions 90.

In operation, air 26 is drawn into the inlet 14 of the compressor section 12 and is progressively compressed to provide compressed air 28 to the combustion section 18. The compressed air 28 flows into the combustion section 18 and is mixed with fuel in the combustor 20 to form a combustible mixture. The combustible mixture is burned in the combustor 20, thereby generating a hot gas 30 that flows from the combustor 20 across a first stage 32 of turbine nozzles 34 and into the turbine section 22. The turbine section generally includes one or more rows of rotor blades 36 axially separated by an adjacent row of the turbine nozzles 34. The rotor blades 36 are coupled to the rotor shaft 24 via a rotor disk. The rotor shaft 24 rotates about an engine centerline CL. A turbine casing 38 at least partially encases the rotor blades 36 and the turbine nozzles 34. Each or some of the rows of rotor blades 36 may be concentrically surrounded by a shroud block assembly 40 that is disposed within the turbine casing 38. The hot gas 30 rapidly expands as it flows through the turbine section 22. Thermal and/or kinetic energy is transferred from the hot gas 30 to each stage of the rotor blades 36, thereby causing the shaft 24 to rotate and produce mechanical work. The shaft 24 may be coupled to a load such as a generator (not shown) so as to produce electricity. In addition, or in the alternative, the shaft 24 may be used to drive the compressor section 12 of the gas turbine.

Figure 2:
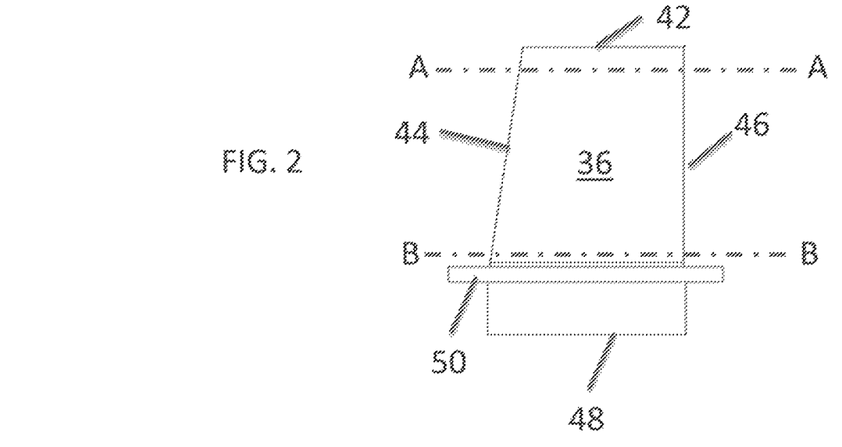
FIG. 2 is an enlarged cross section side view of a portion of the turbine section including an exemplary rotor blade.

FIG. 2 provides an enlarged cross section side view of an exemplary turbine rotor blade or airfoil 36, which extends from an axially forward leading edge 44 to an axially aft trailing edge 46 and from a radially inward root 48 to a radially outer tip 42. The airfoil 36 includes a platform 50 defining a radially inner boundary of a hot gas path.

Figure 3:
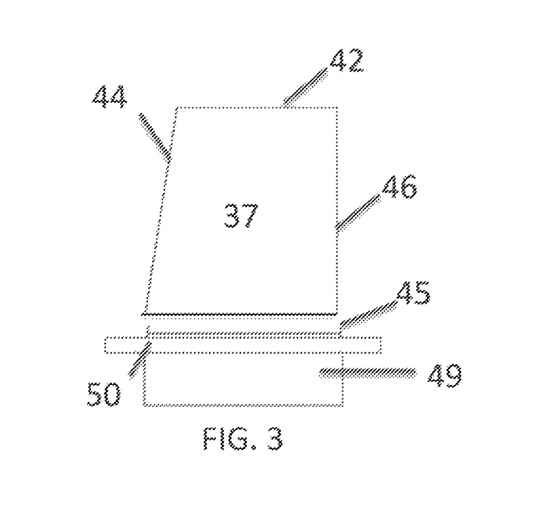
FIG. 3 is an enlarged cross section side view of a portion of the turbine section including a rotor blade.

FIG. 3 provides an enlarged cross section side view of an exemplary turbine rotor blade illustrating the airfoil body 37 detached from the airfoil root portion 49 along line B-B illustrated in FIG. 2. The turbine rotor blade includes an axially forward leading edge 44, an axially aft trailing edge 46, a radially inward root 49 and a radially outer tip 42. In the embodiment of FIG. 3, the root portion 49 and the airfoil body 37 are formed separately then joined together at a joint interface 45 (for example at a braze interface or a weld interface).

Figure 4:
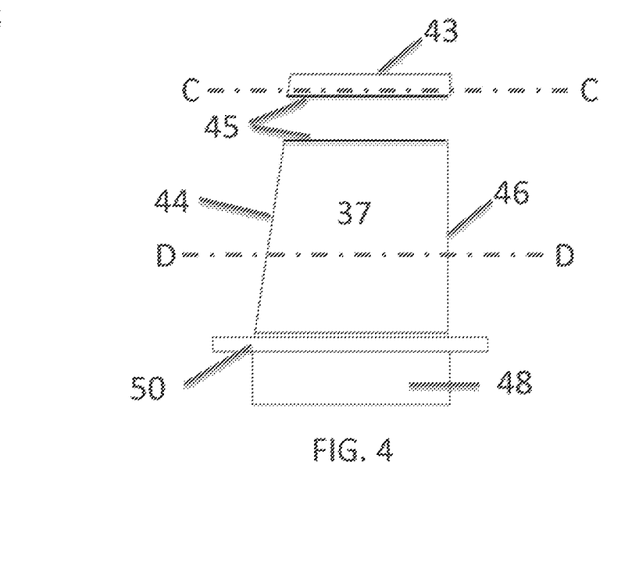
FIG. 4 is an enlarged cross section side view of a portion of the turbine section including a rotor blade.

FIG. 4 provides an enlarged cross section side view of an exemplary turbine rotor blade illustrating the airfoil tip portion 43 detached from the airfoil body 37 along line A-A illustrated in FIG. 2. The turbine rotor blade includes an axially forward leading edge 44, an axially aft trailing edge 46, a radially inward root 48 and a radially outer tip portion 43. In the embodiment of FIG. 4, the airfoil tip portion 43 and the airfoil body portion 37 are formed separately then joined together at a joint interface 45 (for example at a braze interface or a weld interface).

Airfoils composed of superalloy materials such as nickel-based superalloys and other metallic superalloys may be formed using investment casting, which produces the desired material properties for operation within a turbine section 22 of a gas turbine engine 10. However, investment casting may be limited in the fine feature details and ability to produce complex and/or high-resolution geometries with acceptable reproducibility and tolerances. For example, internal cooling channels and flow circuits of an airfoil 36 may be more simplified than desired due to the limitations of investment casting. Therefore, airfoils 36 may be cooled via long, narrow passages placed near the skin of the airfoil via a STEM (Shaped Tube Electrochemical Machining) drilling process. STEM drilling may be used to place channels into an airfoil body portion 37 formed via investment casting without a tip portion 43 and/or without an airfoil root portion 49.

Figure 5:
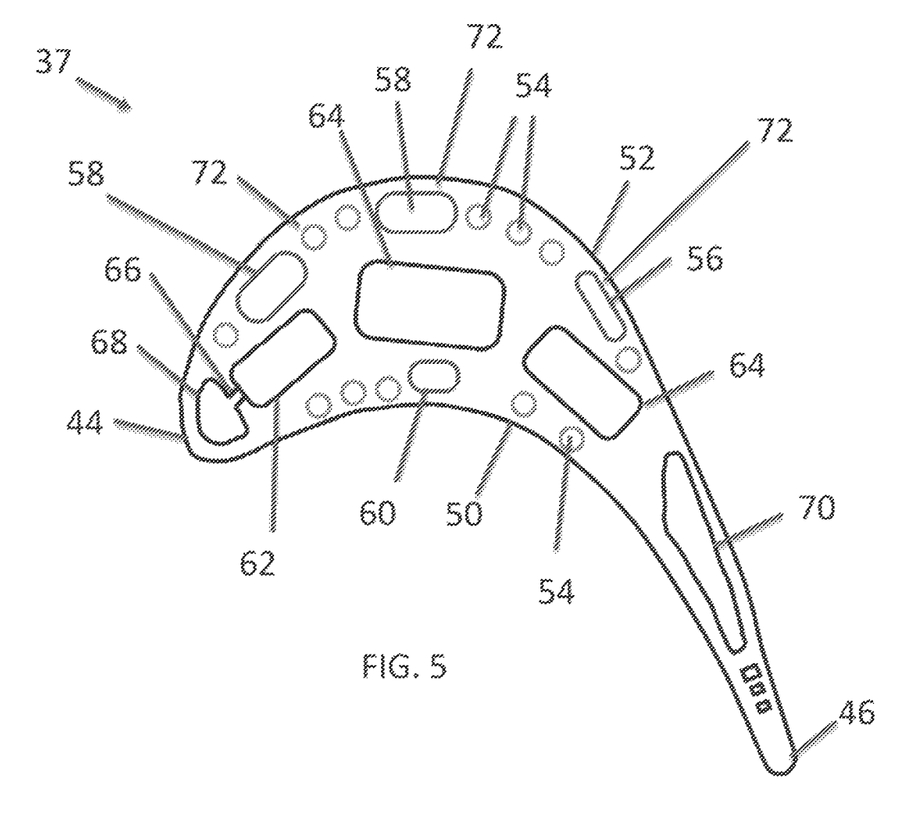
FIG. 5 illustrates a top (radially inward looking) view of a cross-section of an airfoil.

FIG. 5 illustrates a top (radially inward looking) view of a cross-section of airfoil 36 taken along line D-D shown in FIG. 4. The airfoil extends from a leading edge 44 to a trailing edge 46 and from a pressures side 50 to a suction side 52 and includes at least one central cavity 64 extending radially through the airfoil body portion 37. A leading edge feed cavity 62 extends radially through the airfoil 36 and receives cooling air from the airfoil root portion 49 (not shown). Cooling air travels through at least one cross-over hole 66 from the leading edge feed cavity 62 into a leading edge shower head 68 which distributes cooling air to the exterior of the airfoil 36 at the leading edge 44 via a plurality of cooling passages (not shown). The airfoil 36 also includes at least one trailing edge feed cavity 70.

Referring still to FIG. 5, a plurality of circular cooling passages 54 extend radially through the airfoil 36 and are spaced around the perimeter of the airfoil 36. Stated otherwise, the circular cooling passages 54 are proximate the outer boundary of the airfoil. At least one large cooling passage 58 may extend radially through the airfoil 36. The cross section of the one or more large cooling passage 58 may be elongated such that a length of the large cooling passage 58 is about twice the distance of the width of large cooling passage 58. In addition, the length of the large cooling passage 58 may have a linear or straight portion while the width of large cooling passage 58 may be entirely rounded. At least one medium cooling passage 60 may extend radially through the airfoil 36. The cross section of the at least one medium cooling passage 60 may have a length that is about 1.5 times the distance of the width. In addition, the length of the medium cooling passage 60 may have a linear or straight portion while the width of the medium cooling passage 60 may be entirely rounded. Both the length and width of the medium cooling passage 60 may be smaller than the respective length and width of the at least one large cooling passage 58. In addition, a diameter of each of the circular cooling passages 54 may be smaller than the widths of each of the medium and large cooling passages 60 and 58.

The airfoil 36 may include one or more narrow cooling passages 56 extending radially though the airfoil 36. The cross section of the narrow cooling passage 56 may have a length that is about 3 times the distance of the width. In addition, the length of the narrow cooling passage 56 may have a linear or straight portion while the width of the narrow cooling passage 56 may be entirely rounded. The width of the narrow cooling passage 56 may be about the same size as or smaller than the diameter of each circular cooling passage 54, and may be smaller than the widths of each of the medium cooling passage 60 and the large cooling passage 54.

Each of the circular cooling passages 54, the one or more large cooling passage 58, the at least one medium cooling passage 60 and the at least one narrow passage cooling passage 56 are spaced around the perimeter of the airfoil 36. Stated otherwise, each of the cooling passages 54, 56, 58 and 60 are proximate the outer boundary of the airfoil 36, and are thus "perimeter" cooling passages.

A spacing 72 defines the distance between each of the radially extending cooling passages 54, 56, 58 and 60 and the outer boundary of the airfoil 36. The spacing 72 may be about 50% of a smallest cross-section dimension of each of the cooling passages 54, 56, 58 and 60. For example, the spacing 72 may be about 50% of the diameter of the circular cooling passages 54, or about 50% of the widths of each of the large, medium and narrow cooling passages 58, 60 and 56. In other embodiments, the spacing 72 may be less than about 50% of a smallest cross-section dimension of each of the cooling passages 54, 56, 58 and 60. In other embodiments, the spacing 72 may be less than or equal to about 40% of a smallest cross-section dimension of each of the cooling passages 54, 56, 58 and 60. In other embodiments, the spacing 72 may be less than or equal to about 30% of a smallest cross-section dimension of each of the cooling passages 54, 56, 58 and 60. In other embodiments, the spacing 72 may be less than or equal to about 20% of a smallest cross-section dimension of each of the cooling passages 54, 56, 58 and 60. In other embodiments, the spacing 72 may be less than or equal to about 10% of a smallest cross-section dimension of each of the cooling passages 54, 56, 58 and 60. In addition, the spacing 72 may be different for each of or at least one of the cooling passages 54, 56, 58 and 60.

Radial aspect ratios of each the cooling passages 54, 56, 58 and 60 are defined as the radial length of each cooling passage 54, 56, 58 and 60 divided by the smallest cross-section dimension of the respective cooling passage, the smallest dimension being the diameter for circular cooling passages 54 and the width for the large, medium and narrow cooling passages, 58, 60 and 56. Using STEM drilling, each of the cooling passage 54, 56, 58 and 60 may have radial aspect ratios of greater than about 15 to 1. In other embodiments, each of the cooling passage 54, 56, 58 and 60 may have radial aspect ratios of greater than about 25 to 1. In other embodiments, each of the cooling passage 54, 56, 58 and 60 may have radial aspect ratios of greater than about 40 to 1. In other embodiments, each of the cooling passage 54, 56, 58 and 60 may have radial aspect ratios of greater than about 60 to 1. In other embodiments, each of the cooling passage 54, 56, 58 and 60 may have radial aspect ratios of greater than about 80 to 1. In other embodiments, each of the cooling passage 54, 56, 58 and 60 may have radial aspect ratios of greater than about 100 to 1. Including high aspect ratio radial cooling passages 54, 56, 58 and 60 allows cooling flow to be brought very close to the outer periphery of the airfoil where cooling flow is needed most while simultaneously maintaining the structural integrity of the airfoil 36 due to the relatively narrow cross-section of the radial cooling passages 54, 56, 58 and 60. In addition, the high aspect ratio radial cooling passages 54, 56, 58 and 60 allow cooling flow to reach the full radial span of the airfoil, including portions of the airfoil tip 42, access to which often provides challenges.

Figure 6:
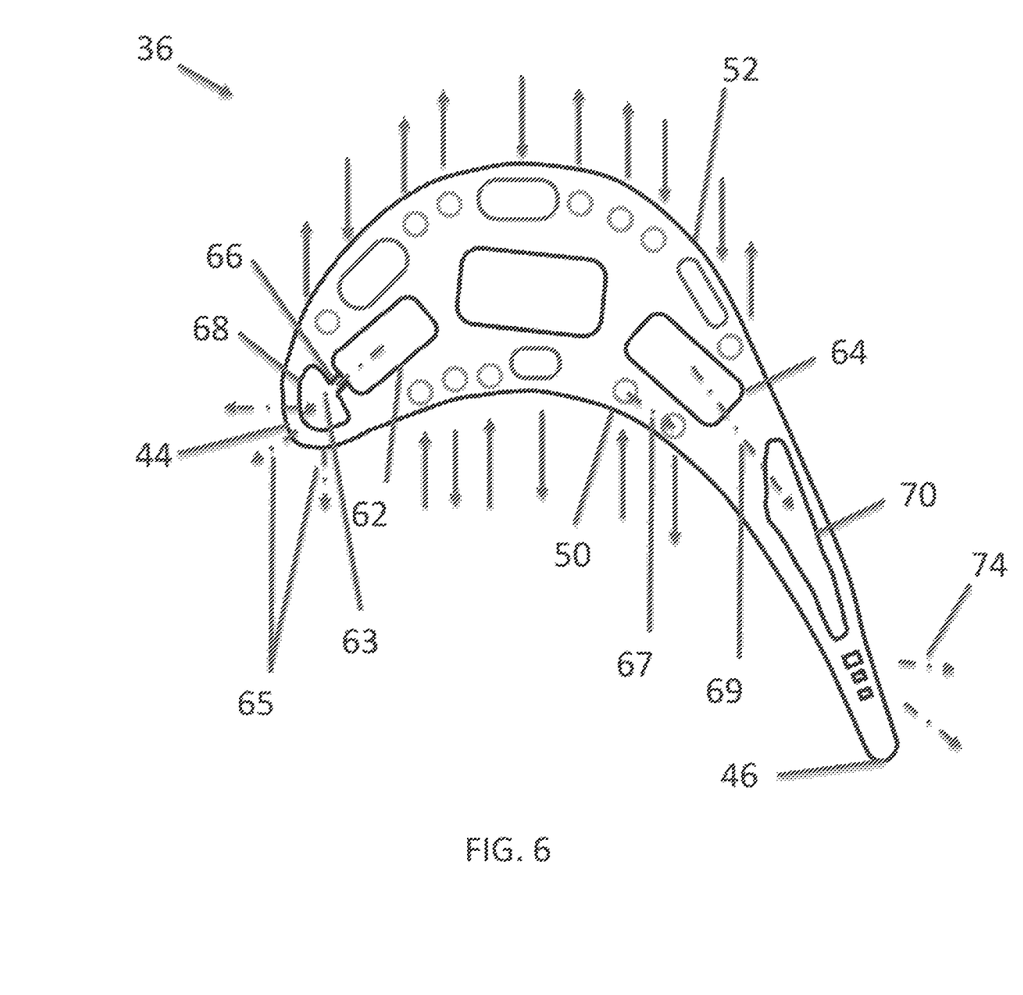
FIG. 6 illustrates a top view (radially inward looking) of a cross-section of an airfoil.

FIG. 6 illustrates a top view (radially inward looking) of a cross-section of airfoil 36 taken along cut-line D-D shown in FIG. 4 including exemplary cooling flow directions. Arrows near each of the cooling passage 54, 56, 58 and 60 indicate the flow direction within each passage. Up arrows indicate cooling flow travelling radially outwardly from the airfoil root 48 (not shown) toward the airfoil tip 42 (not shown). Down arrows indicate cooling flow flowing in a radially inward direction from an airfoil tip 42 (not shown) to an airfoil root 48 (not shown). Cooling flows that flow radially outwardly (i.e., up) through one passage may flow radially inward (i.e., down via an adjacent passage) and exit the airfoil 36 through the root portion 48 (not shown). A flow connection or manifold connecting adjacent passageways may be formed in the airfoil tip portion 43 (not shown). In some embodiments, cooling flows that travel radially outwardly through the airfoil 36 may exit the airfoil at the tip 42 (not shown), at the leading edge 44, at the trailing edge 46, at the suction side 52 or at the pressure side 50.

Still referring to FIG. 6, the airfoil 36 may include cooling flows that are directed in directions other than the radial direction 94, for example the axial 92 and/or circumferential 90 directions. The airfoil 36 may include a crossover cooling flow 63 that originates in leading edge feed cavity 62, flows through the at leading one cross-over hole 66 into a leading edge shower head 68. The crossover cooling flow 63 feeds a plurality of leading edge film cooling flows 65 that exit the airfoil at the least edge 44. A pressure side cooling flow 67 may flow between two or more of the plurality of circular cooling passages 54, (as well as between large cooling passages 58, medium cooling passages 60 and narrow cooling passages 56) with the connection through which the pressure side cooling flow 67 flows occurring in the airfoil body portion 37 rather than in the airfoil tip 42 (not shown). Similarly, the airfoil 36 may also include cooling flows within the airfoil body portion 37 proximate the suction side 52. The airfoil 36 may include a trailing edge crossover flow 69 that originates in the at least one central cavity 64 and flows into the trailing edge feed cavity 70 and feeds a plurality of trailing edge film cooling flows 74 at the airfoil trailing edge 46.

Figure 7:
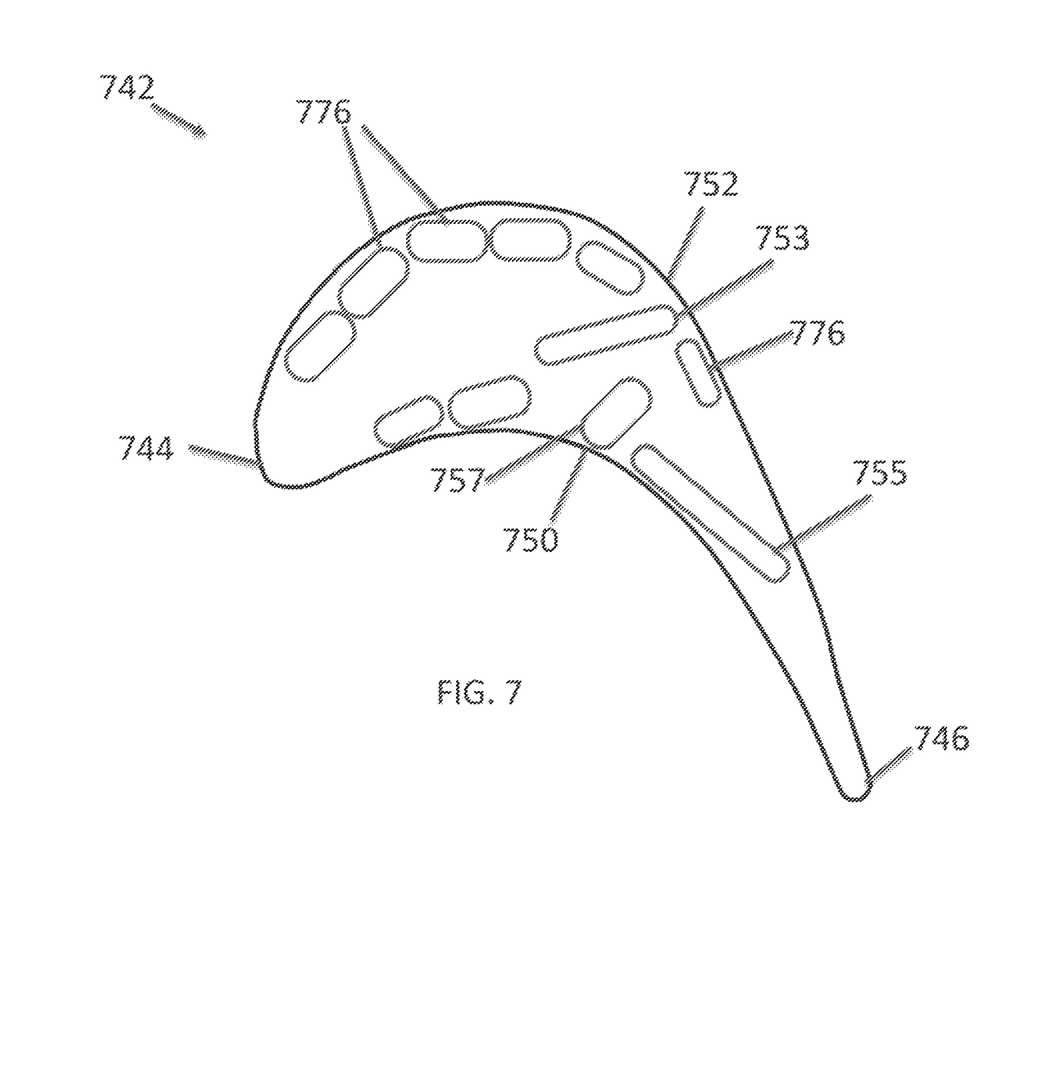
FIG. 7 illustrates a bottom view (radially outward looking) of a cross-section of an airfoil tip.

FIG. 7 illustrates a bottom view (radially outward looking) of a cross-section of an airfoil tip 742 taken along cut-line C-C shown in FIG. 4, including a tip leading edge 744, a tip trailing edge 746, a tip suction side 752 and a tip pressure side 750. The airfoil tip 742 includes several connection manifolds 776 that interface with the radial cooling passages 54, 56, 58 and 60 within the airfoil body portion 37 shown in FIGS. 5 and 6. When the airfoil tip 742 of FIG. 7 is joined with the airfoil body portion 37 shown in FIGS. 5 and 6, the connection manifolds 776 may provide fluid communication between cooling passage 54, 56, 58 and 60 and adjacent cooling passage 54, 56, 58 and 60. Each of the connection manifolds 776 may be contoured such that cooling flows that flow radially outward through the airfoil body portion 37 may enter one of the connection manifolds 776 where they are redirected about 180 degrees so that they flow in a radially inward direction back down through the airfoil body portion 37 via an adjacent cooling passage 54, 56, 58 and 60. The embodiment of FIGS. 2-7 illustrate an airfoil 36 that can be formed by forming radial cooling passages 54, 56, 58 and 60 in an airfoil body portion 37 and joining the airfoil body portion 37 with a separately formed airfoil tip portion 43 which includes a plurality connection manifolds 776 that provide the flow connections for completing the various flow circuits within the airfoil 36.

Figure 8:
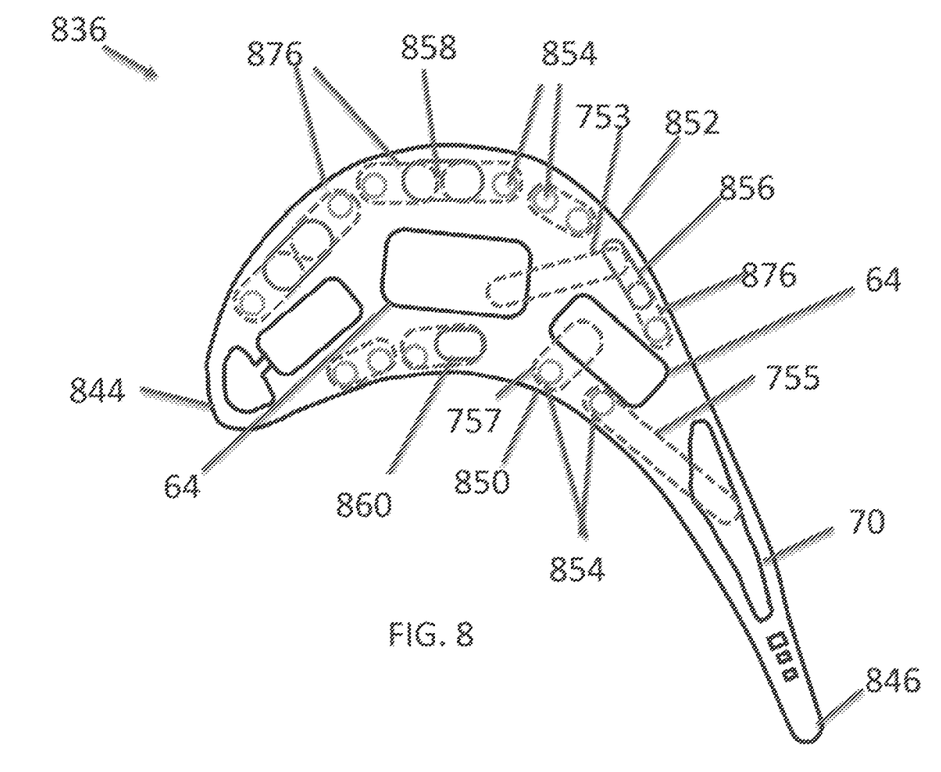
FIG. 8 illustrates a top view (radially inward looking) of a cross-section of an airfoil.

FIG. 8 illustrates a top view (radially inward looking) of a cross-section of airfoil 36 taken along cut-line D-D shown in FIG. 4 with the plurality of tip connection manifolds 876 of FIG. 7 superimposed with dash lines on top. The plurality of tip connection manifolds 876 may join two or more radial cooling passages 54, 56, 58 and 60 including cooling passages of different sizes. For example, a connection manifold 876 may connect: a large cooling passage 858 to a circular cooling passage 854, a narrow cooling passage 856 to a circular cooling passage 854, a circular cooling passage 854 to another circular cooling passage 854, or a medium cooling passage 860 to a circular cooling passage 854. Other cooling passageway connections and configurations are also possible. In addition, multiple tip connection manifolds 876 may connect to a single radial cooling passage 54, 56, 58 and 60.

Referring to FIGS. 7 and 8, the present embodiments include an open topology architecture which allows flow connections to be made via tip manifold connections 776, 876 such that spent or used cooling flow may be redirected to any other location or radial cooling passage 54, 56, 58 and 60. The open topology architecture is not limited to the geometry and/or topology of, for example, a cast serpentine cooling circuit, which may be limited in the various connections that can be made between radial cooling passage 54, 56, 58 and 60 due to the constraints imposed by a core during the investment casting process. For example, using the open topology architecture of the present embodiments, cooling fluid may flow radially outward through a high aspect ratio perimeter cooling channel and then be redirected radially inward via a tip connection manifold 776, 876 into a central cavity 64.

Still referring to FIGS. 7 and 8, a first manifold 753 fluidly connects a narrow radial cooling passage 856 disposed along an airfoil suction side 852 to a central airfoil cavity 64. A second manifold 755 fluidly connects a trailing edge cavity to a pressure side small radial cooling passage 854. A third manifold 757 fluidly connects a small radial cooling passage 854 disposed along an airfoil pressure side 850 to a central airfoil cavity 64. The present claimed embodiments may also include other fluid connections, arrangements and configurations as illustrated in the Figures and as disclosed herein.

Figure 9:
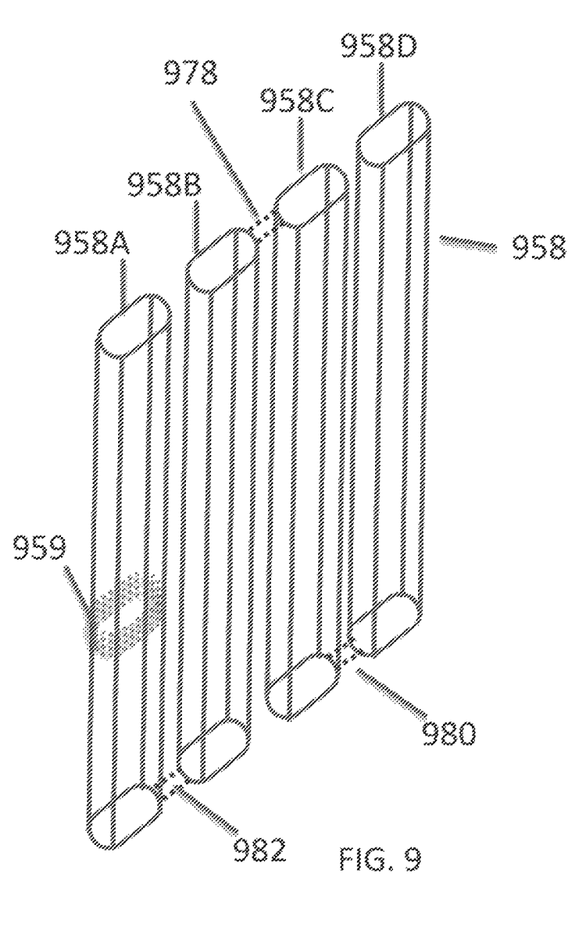
FIG. 9 illustrates a plurality of radial cooling passages that may be found in an airfoil.

FIG. 9 illustrates a plurality of radial cooling passages 958A-958D that may be found in an airfoil 36 of the present embodiments. A first radial cooling passage 958A connects to a second radial cooling passage 958B via a first plurality of drill holes 982 at a radially inner location on each of the first and second radial cooling passages 958A and 958B. The second radial cooling passage 958B connects to a third radial cooling passage 958C via a second plurality of drill holes 978 at a radially outer location on each of the second and third radial cooling passages 958B and 958C. The third radial cooling passage 958C connects to a fourth radial cooling passage 958D via a third plurality of drill holes 980 at a radially inner location on each of the third and fourth radial cooling passages 958C and 958D. The interior of each of the radial cooling passages 958A-958D may include a plurality of flow conditioning features (or structures) 959 such as dimples, turbulators, notches, grooves, metering features, etc. for providing enhanced thermal and/or flow conditions within the radial cooling passages 958A-958D. The plurality of flow conditioning features 959 may be formed during the STEM drilling process by increasing or decreasing the feed rate during electrochemical machining, or by masking the tips of electrodes and/or varying the current density, current orientation, or both. The first, second and third pluralities of drill holes 982, 978 and 980 may be located within about 10% of less of the radial length of the plurality of radial cooling passages 958A-958D. For example, the first and third pluralities of drill holes 982 and 980 may be located within 10% of the radial length of the plurality of radial cooling passages 958A-958D from a radially inward end of the plurality of radial cooling passages 958A-958D. Similarly, the second plurality of drill holes 978 may be located within 10% of the radial length of the plurality of radial cooling passages 958A-958D from a radially outward end of the plurality of radial cooling passages 958A-958D.

Each of the plurality of radial cooling passages 958A-958D may include the geometries and/or characteristics of the radial cooling passages 54, 56, 58 and 60 described above and illustrated in FIGS. 5, 6, and 8. In other embodiments, the airfoil 36 may include other numbers of radial cooling passages 958A-958D, i.e., more or less than 4 passages. In other embodiments, the airfoil may include multiple pluralities of flow conditioning features 959 on each of the radial cooling passages 958A-958D or on only a subset of the radial cooling passages 958A-958D. In other embodiments, the airfoil 36 may include different numbers and locations of drill holes 978, 980 and 982.

Figure 10:
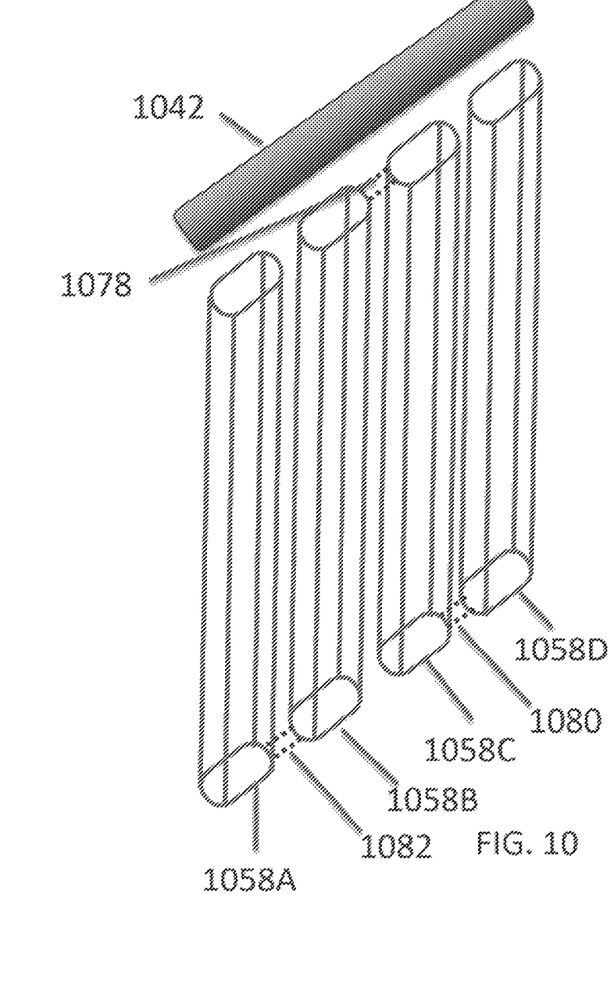
FIG. 10 illustrates a plurality of radial cooling passages that may be found in an airfoil.

FIG. 10 illustrates a plurality of radial cooling passages 1058A-1058D that may be found in an airfoil 36 of the present embodiments, including first, second and third sets of drill holes 1082, 1080 and 1078 similar to those of FIG. 9. FIG. 10 illustrates a standard airfoil tip 1042 that simply caps each of the radial cooling passages 1058A-1058D and does not connect the radial cooling passages 1058A-1058D with each other. The drill holes 1082, 1080 and 1078 illustrated in FIG. 10 (as well as those in FIG. 9) connect the radial cooling passages 1058A-1058D to each other reducing or eliminating the need for connection manifolds 776, 876 such as those illustrated in FIGS. 7 and 8.

Figure 11:
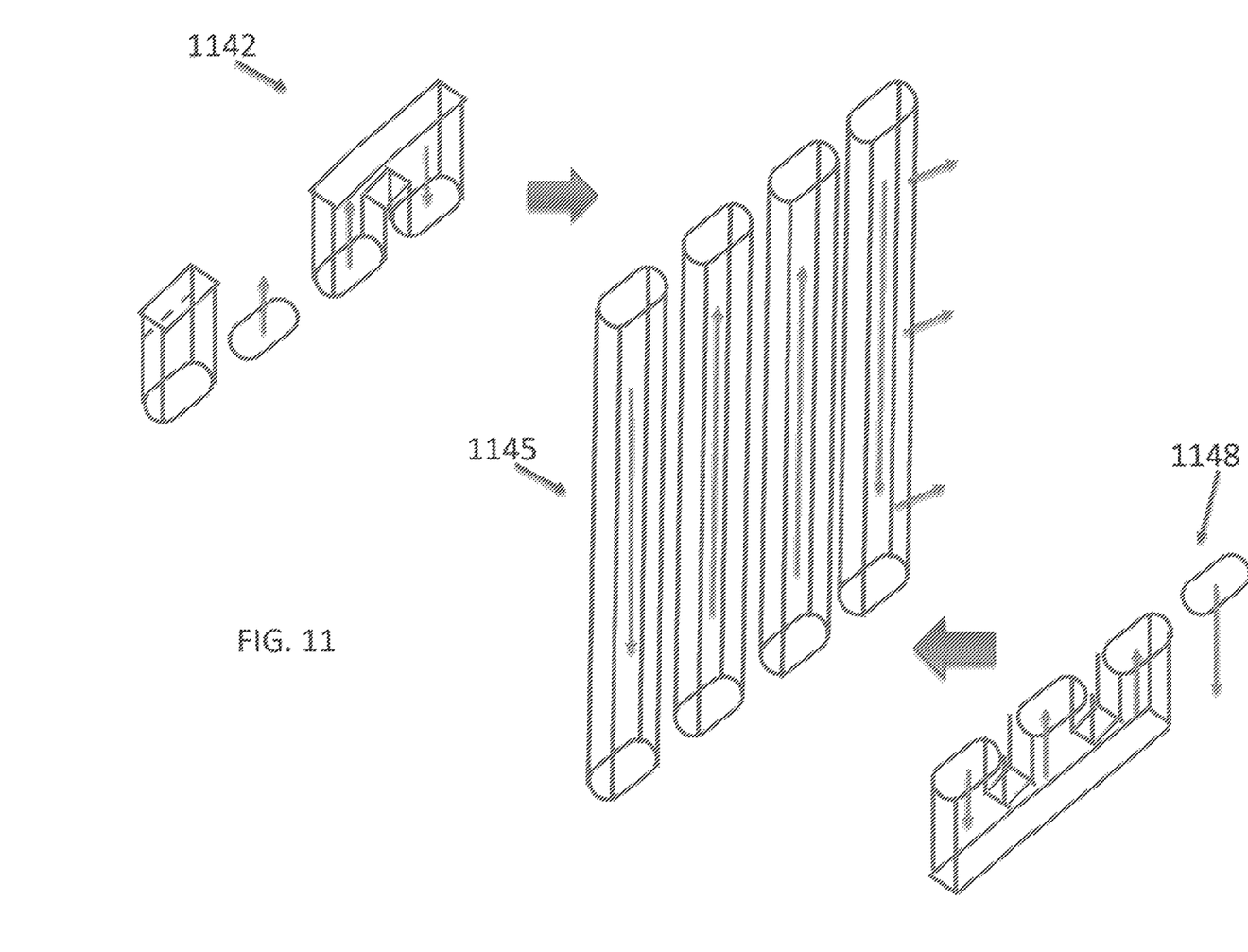
FIG. 11 illustrates a plurality of airfoil tip passage connections, an airfoil body and a plurality of airfoil root passages.

FIG. 11 illustrates a plurality of airfoil tip passage connections 1142, a plurality of cooling passages 1145 in an airfoil body portion 37, and a plurality of airfoil root passage connections 1148, according to the present embodiments. The configuration illustrated in FIG. 11 does not include drill holes to connect the plurality of cooling passages 1145 in the airfoil body portion and instead uses the plurality of airfoil tip passage connections 1142 to connect the passages at the tip 42 (not shown) of an airfoil 36, and the plurality of airfoil root passage connections 1148 to connect passages at the root 48 (not shown) of the airfoil 36. The plurality of airfoil tip passage connections 1142 and the plurality of airfoil root passage connections 1148 may be joined to the airfoil body portion via brazing, welding and other joining methods. The plurality of airfoil tip passage connections 1142 may be similar in shape, geometry and/or function to the connection manifolds 776, 876 shown in FIGS. 7 and 8.

Figure 12:
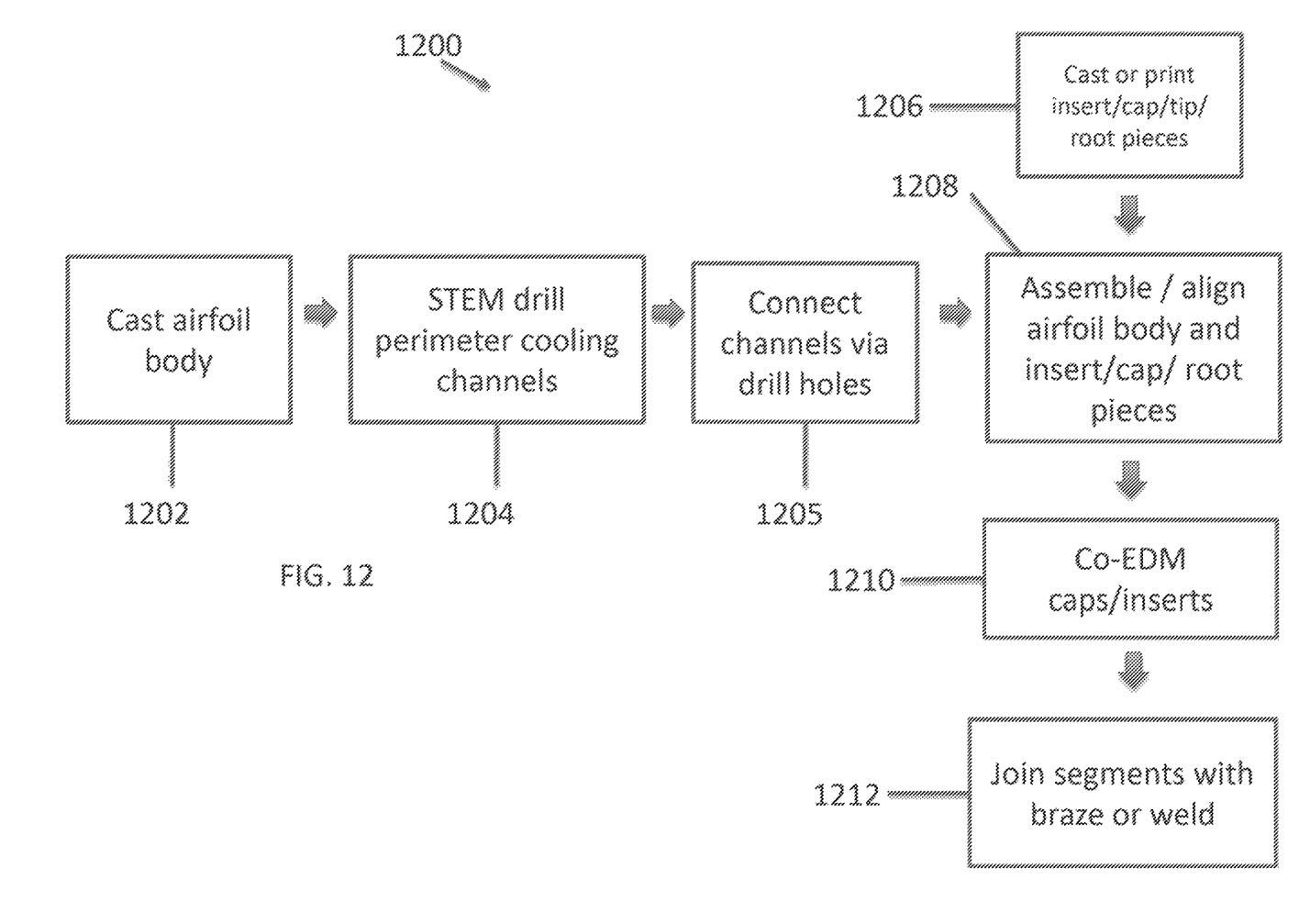
FIG. 12 illustrates a method of forming an airfoil, according to various embodiments of the present disclosure.

FIG. 12 illustrates a method 1200 of forming an airfoil 36 according to the present embodiments. At step 1202, a body of an airfoil 36 is cast using investment casting. At 1204, radial cooling passages 54, 56, 58 and 60 are drilled using a STEM (Shaped Tube Electrochemical Machining) drilling process. At 1205, the method may include connecting the radial cooling passages 54, 56, 58 and 60 via drill holes. At 1206, an airfoil tip portion 43 is formed via additive manufacturing, investment casting or another forming processes. Also at 1206, an insert for an airfoil 36 and/or an airfoil root portion 49 may be formed via additive manufacturing, investment casting or another forming processes. In some embodiments, only the airfoil tip portion 43 will be formed separately from the casting of the airfoil body portion 37. In other embodiments, the airfoil tip portion 43, the airfoil root portion 49 and/or an insert of the airfoil 36 will each be formed separately from the casting of the airfoil body portion 37. In other embodiments, the airfoil tip portion 43, the airfoil root portion 49 and the insert of the airfoil 36 will all be formed via casting during the casting of the airfoil body portion 37. At 1208, the method includes assembling and/or aligning the individual airfoil components including the airfoil body portion 37, along with the airfoil tip portion 43, the airfoil root portion 49 and/or an insert of the airfoil 36. At 1210, the method includes using a co-drilling (via electrical discharge machining (EDM) or other process) the airfoil body portion 37 along with the other portions that may be formed separately such as but not limited to the airfoil tip portion 43, the airfoil root portion 49, an airfoil trailing edge 46, the airfoil leading edge 44, and an insert of the airfoil 36. For example, the airfoil body portion 37 and the airfoil tip portion 43 may undergo electrical discharge machining concurrently at interfacing surfaces of each to enhance mating of interfacing surfaces during brazing, which may permit defects of no greater than 1-2 mils (i.e., 1-2 thousandths of an inch). At 1212, the method includes joining the portions of the airfoil 36 together via brazing, welding or other method of joining. In one embodiment, the airfoil body portion 37 and the airfoil tip portion 43 are joined via a braze interface resulting from a brazing process.

Still referring to FIG. 12, other steps may be included following step 1212 including, but not limited to, heat treatment, surface finishing, polishing, de-burring, coating, as well as others. In addition, other steps may be included throughout the process such as post-process steps after the airfoil tip portion 43 and/or other subcomponents of the airfoil 36 are formed, but prior to assembly. In addition, one or more of the steps included in FIG. 12 may not be performed in some embodiments. The method 1200 may also include the steps of forming locating features and/or alignment features in the airfoil body portion 37 and/or airfoil tip portion 43 at steps 1202 and 1206 respectively, which are then used at step 1208 to ensure that the portions of the airfoil assembly are aligned correctly prior to co-drilling via EDM or other process. For example, grooves, notches, pins, channels, markers and other features can be added to the airfoil body portion 37 and/or airfoil tip portion 43 such that a corresponding receiving feature on the interfacing surface of the airfoil body portion 37 and/or airfoil tip portion 43 engages the alignment feature(s) to ensure the two airfoil portions are precisely located relative to each other prior to drilling, machining and/or joining.

The method illustrated in FIG. 12 allows the airfoil 36 and various subcomponents thereof to maintain an open topology until they are joined together at step 1212. The open topology allows the radial cooling passages 54, 56, 58 and 60 to be drilled using a STEM (Shaped Tube Electrochemical Machining) drilling process around the perimeter of the airfoil 36. The open topology further allows the radial cooling passages 54, 56, 58 and 60 to be connected via drill holes that are about 90-degrees from the radial direction 94. The open topology also allows the radially inward portion of the airfoil tip portion 43 to be open during formation (either via additive manufacturing or via investment casting) which allows the radially inward portion of the airfoil tip portion 43 to include enhanced feature details formed in the several connection manifolds 776. By using STEM to form the radial cooling passages 54, 56, 58 and 60 instead of casting allows the radial cooling passages 54, 56, 58 and 60 to be placed closer to the surface of the airfoil 36. The precision of the STEM process may allow for a higher part yield than can be reliably achieved via casting.

The airfoil 36 of the present embodiment may be a rotating airfoil such as turbine blades and buckets as well as a stationary airfoil such as, but not limited to, gas turbine airfoil vanes or turbine nozzle airfoils. By forming high aspect ratio (greater than 15, 25, 40, 60, 80 and/or 100) radial cooling passages 54, 56, 58 and 60 adjacent and/or proximate to the perimeter of the airfoil 36, the coolest airflow may flow closest to the outer periphery of the airfoil, enhancing the thermal management (including eliminating hot spots, reducing thermal gradients and reducing the amount of required cooling flow) of the airfoil 36. The method 1200 of forming an airfoil using an open topology allows precision, high aspect ratio radial cooling passages 54, 56, 58 and 60 to be formed in the airfoil 36, while also allowing flow circuit connections to be made via drill holes 978, 980, and 982 and/or via connection manifolds 776, 876 in the airfoil tip portion 43.

This written description uses examples to disclose the present embodiments, including the best mode, and also to enable any person skilled in the art to practice the present embodiments, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An airfoil comprising:
an airfoil body portion;
an airfoil tip portion disposed radially outward of the airfoil body portion;
an airfoil root portion; and
a plurality of radial cooling passages extending through the airfoil body portion from the airfoil root portion to the airfoil tip portion;
wherein the airfoil body portion and the airfoil tip portion are joined at one of a braze interface and a weld interface;
wherein the airfoil tip portion further comprises at least one manifold, the at least one manifold fluidly connecting at least one radial cooling passage of the plurality of radial cooling passages to at least one other radial cooling passage; and
wherein each radial cooling passage of the plurality of radial cooling passages is spaced less than about 50% of the smallest cross-section dimensional of each radial cooling passage from an airfoil perimeter.

2. The airfoil of claim 1, wherein each radial cooling passage of the plurality of radial cooling passages defines an aspect ratio comprising a radial length of each radial cooling passage divided by the smallest cross-sectional dimension of each radial cooling passage; and
wherein at least one radial cooling passage of the plurality of radial cooling passages comprises an aspect ratio greater than about 60 to 1.

3. The airfoil of claim 2, further comprising:
at least one hole connecting at least one radial cooling passage of the plurality of radial cooling passages to at least one other radial cooling passage; and
the at least one radial cooling passage of the plurality of radial cooling passages further comprising at least one flow conditioning structure;
wherein the airfoil body portion is formed via investment casting;
wherein the airfoil tip portion is formed via additive manufacturing; and
wherein the smallest cross-sectional dimension is a width of each radial cooling passage.

4. The airfoil of claim 2, wherein the smallest cross-sectional dimension is one of a diameter of each radial cooling passage and a width of each radial cooling passage.

5. The airfoil of claim 1, further comprising:
at least one hole connecting at least one radial cooling passage of the plurality of radial cooling passages to at least one other radial cooling passage.

6. The airfoil of claim 1, wherein the airfoil tip portion is formed via additive manufacturing or investment casting.

7. The airfoil of claim 1, wherein the airfoil body portion is formed via investment casting.

8. The airfoil of claim 1,
wherein the airfoil root portion is disposed radially inward of the airfoil body portion; and
wherein the airfoil body portion and the airfoil root portion are joined at a braze interface.

9. An airfoil comprising:
an airfoil body portion;
an airfoil tip portion disposed radially outward of the airfoil body portion;
an airfoil root portion; and
a plurality of radial cooling passages extending through the airfoil body portion from the airfoil root portion to the airfoil tip portion;
wherein the airfoil tip portion further comprises at least one manifold, the at least one manifold fluidly connecting at least one radial cooling passage of the plurality of radial cooling passages to at least one other radial cooling passage;
wherein the at least one manifold is radially outward of at least one joint interface; and
wherein each radial cooling passage of the plurality of radial cooling passages is spaced less than about 50% of the smallest cross-sectional dimension of each radial cooling passage from an airfoil perimeter.

10. The airfoil of claim 9, wherein each radial cooling passage of the plurality of radial cooling passages defines an aspect ratio comprising a radial length of each radial cooling passage divided by the smallest cross-sectional dimension of each radial cooling passage;
wherein at least one radial cooling passage of the plurality of radial cooling passages comprises an aspect ratio greater than about 60 to 1; and
wherein the at least one joint interface comprises at least one of a braze interface and a weld interface.

11. The airfoil of claim 9, wherein the smallest cross-sectional dimension is one of a diameter of each radial cooling passage and a width of each radial cooling passage.

12. The airfoil of claim 9, further comprising at least one hole connecting at least one radial cooling passage of the plurality of radial cooling passages to at least one other radial cooling passage.

13. A method of forming an airfoil, the method comprising:
forming an airfoil body portion via investment casting;
forming an airfoil tip portion;
joining the airfoil tip portion to the airfoil body portion and disposing the airfoil tip portion radially outward of the airfoil body portion;
forming an airfoil root portion;
forming a plurality of radial cooling passages within the airfoil body portion, the plurality of radial cooling passages extending through the airfoil body portion from the airfoil root portion to the airfoil tip portion;
wherein the forming the airfoil tip portion further comprises forming at least one manifold fluidly connecting at least one radial cooling passage of the plurality of radial cooling passages to at least one other radial cooling passage; and
wherein each radial cooling passage of the plurality of radial cooling passages is spaced less than about 50% of the smallest cross-sectional dimension of each radial cooling passage from an airfoil perimeter.

14. The method of claim 13, wherein forming the airfoil tip portion comprises forming the airfoil tip portion via additive manufacturing.

15. The method of claim 13, wherein forming the airfoil tip portion comprises forming the airfoil tip portion via investment casting.

16. The method of claim 13, wherein each radial cooling passage of the plurality of radial cooling passages defines an aspect ratio comprising a radial length of each radial cooling passage divided by the smallest cross-sectional dimension of the at least one radial cooling passage; and wherein the aspect ratio is greater than about 60 to 1.

17. The method of claim 13, further comprising:
forming the plurality of radial cooling passages within the airfoil body portion using shaped tube electrochemical machining (STEM); and
forming at least one drill hole in the airfoil body portion connecting at least one radial cooling passage to at least one other radial cooling passage of the plurality of radial cooling passages.

18. The method of claim 13, further comprising:
electrical discharge machining (EDM) the airfoil tip portion and the airfoil body portion prior to joining the airfoil tip portion to the airfoil body portion.

19. The method of claim 13, further comprising:
forming at least one flow conditioning feature in at least one radial cooling passage of the plurality of radial cooling passages using shaped tube electrochemical machining (STEM).

20. The method of claim 13, wherein joining the airfoil tip portion to the airfoil body portion comprises joining the airfoil tip portion to the airfoil body portion via at least one of a braze process and a weld process.

\* \* \* \* \*